United States Patent
Ishimasa

(10) Patent No.: US 8,243,373 B2
(45) Date of Patent: Aug. 14, 2012

(54) LENS BARREL AND IMAGING APPARATUS

(75) Inventor: Toru Ishimasa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 304 days.

(21) Appl. No.: 12/643,516

(22) Filed: Dec. 21, 2009

(65) Prior Publication Data

US 2010/0165488 A1 Jul. 1, 2010

(30) Foreign Application Priority Data

Dec. 27, 2008 (JP) ................. 2008-335558

(51) Int. Cl.
*G02B 9/08* (2006.01)
*G02B 7/02* (2006.01)
*G03B 17/04* (2006.01)
*G03B 9/00* (2006.01)
*G03B 9/08* (2006.01)

(52) U.S. Cl. ........ 359/740; 359/817; 359/821; 359/822; 396/348; 396/458; 396/462

(58) Field of Classification Search .......... 359/738–740, 359/817; 396/348–350, 458
See application file for complete search history.

(56) References Cited

U.S. PATENT DOCUMENTS

| 6,835,006 B2 * | 12/2004 | Tanaka et al. ........... 396/349 |
| 7,295,382 B2 * | 11/2007 | Takahashi .............. 359/694 |
| 7,448,811 B2 * | 11/2008 | Nagae ................. 396/348 |
| 7,866,901 B2 | 1/2011 | Tsuji |
| 2004/0076420 A1 * | 4/2004 | Orimoto ................ 396/349 |

FOREIGN PATENT DOCUMENTS

| JP | 2003-121720 | * | 4/2003 |
| JP | 3496667 B2 | | 2/2004 |
| JP | 2004-347615 A | | 12/2004 |
| JP | 2004-347615 A | | 12/2004 |

* cited by examiner

*Primary Examiner* — Jordan Schwartz
(74) *Attorney, Agent, or Firm* — Carter, DeLuca, Farrell & Schmidt LLP

(57) ABSTRACT

When the lens barrel is in the storage state, a part of a lens group and a group cylinder are inserted into an aperture of a diaphragm unit and a shutter blade of a shutter unit is closed for light shielding. With this arrangement, the cylinder length in the storage state is shortened, and the performance degradation of an image sensor and optical components provided on a front side of an image sensor can be prevented as well.

10 Claims, 11 Drawing Sheets

LENS BARREL AND IMAGING APPARATUS

BACKGROUND OF THE INVENTION

1. Field of the Invention

The present invention relates to a lens barrel and an imaging apparatus having the lens barrel.

2. Description of the Related Art

Conventionally, for a zoom lens barrel that is extended in the image-taking state and is retracted in the storage-state, various techniques have been proposed for shortening the dimension (cylinder length) in the optical axis direction in the storage state.

Japanese Patent Laid-Open No. 2004-347615 discloses a technique in which a lens barrel is provided that enables the cylinder length thereof to be shortened by opening a lens shutter in the storage state so as to insert a lens group into an aperture; and a camera provided with such lens barrel.

Also, as in Japanese Patent Laid-Open No. 2004-347615 described above, Japanese Patent No. 3496667 discloses a technique for shortening the cylinder length in the storage state as well as protecting an image sensor and a color filter by preventing them from being exposed by external light using a lens barrier as a light shielding member.

However, the conventional technique disclosed in Japanese Patent Laid-Open No. 2004-347615 does not take into account the deterioration of such an image sensor, color filter, and the like that is caused by external light that reaches the image sensor and the color filter in the storage state. Also, the conventional technique disclosed in Japanese Patent No. 3496667 cannot achieve perfect light shielding with a lens barrier that is employed as a light shielding member in the storage state. As a result, sufficient light shielding cannot be obtained even when a lens barrier provided at the tip of the barrel is in a closed state. The performance degradation of the image sensor and the optical components provided on the front side of the image sensor may occur because light that slightly enters from the space of the lens barrier reaches the image sensor.

SUMMARY OF THE INVENTION

The lens barrel according to an aspect of the present invention includes a lens that moves in a direction along its optical axis between an image-taking state and a storage state, a diaphragm unit configured to restrict an opening diameter of a light path passing through the lens in the image-taking state, and a shutter unit configured to be opened so as not to shield the light path passing through the lens in the image-taking state. One among the diaphragm unit and the shutter unit is disposed relatively movably in a direction along the optical axis with respect to the lens and opens in the storage state so as to arrange at least a part of the lens within an aperture, and the other one closes an aperture so as to shield the light passing through the lens in the storage state.

Further features of the present invention will become apparent from the following description of exemplary embodiments with reference to the attached drawings.

DESCRIPTION OF THE EMBODIMENTS

Hereinafter, the best mode for carrying out the invention will now be described with reference to the accompanying drawings.

As described below, each drawing is a schematic view, and the respective portions may be exaggerated in both size and shape for ease of understanding.

In the following description, specific numerical values, shapes, and operations are shown, which may be appropriately modified.

Figure 1:
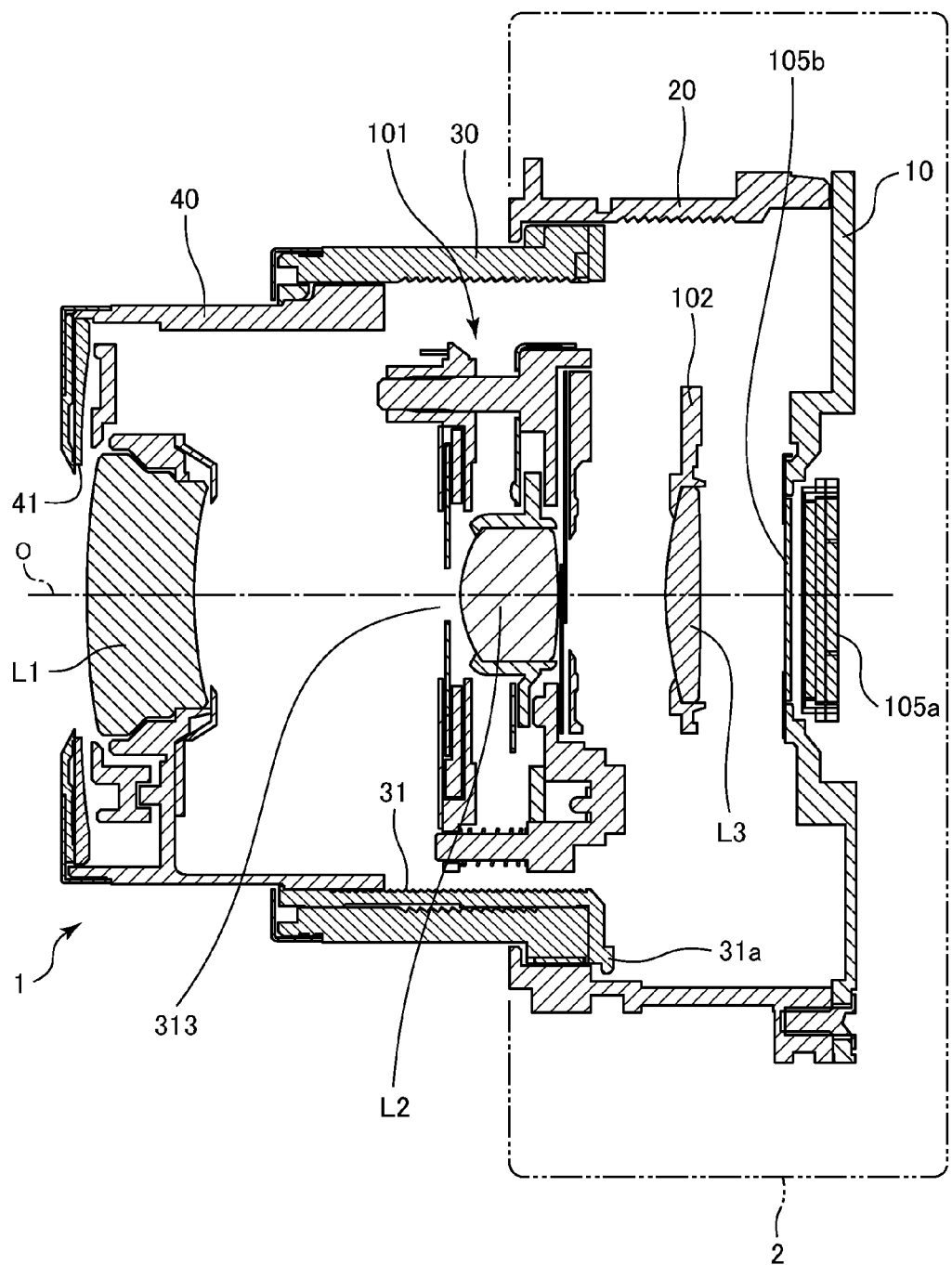
FIG. 1 is a sectional view showing the image-taking state of an imaging apparatus provided with a lens barrel according to the present invention.

FIG. 1 is a sectional view showing the image-taking state of an imaging apparatus provided with a lens barrel according to the present invention.

Figure 2:
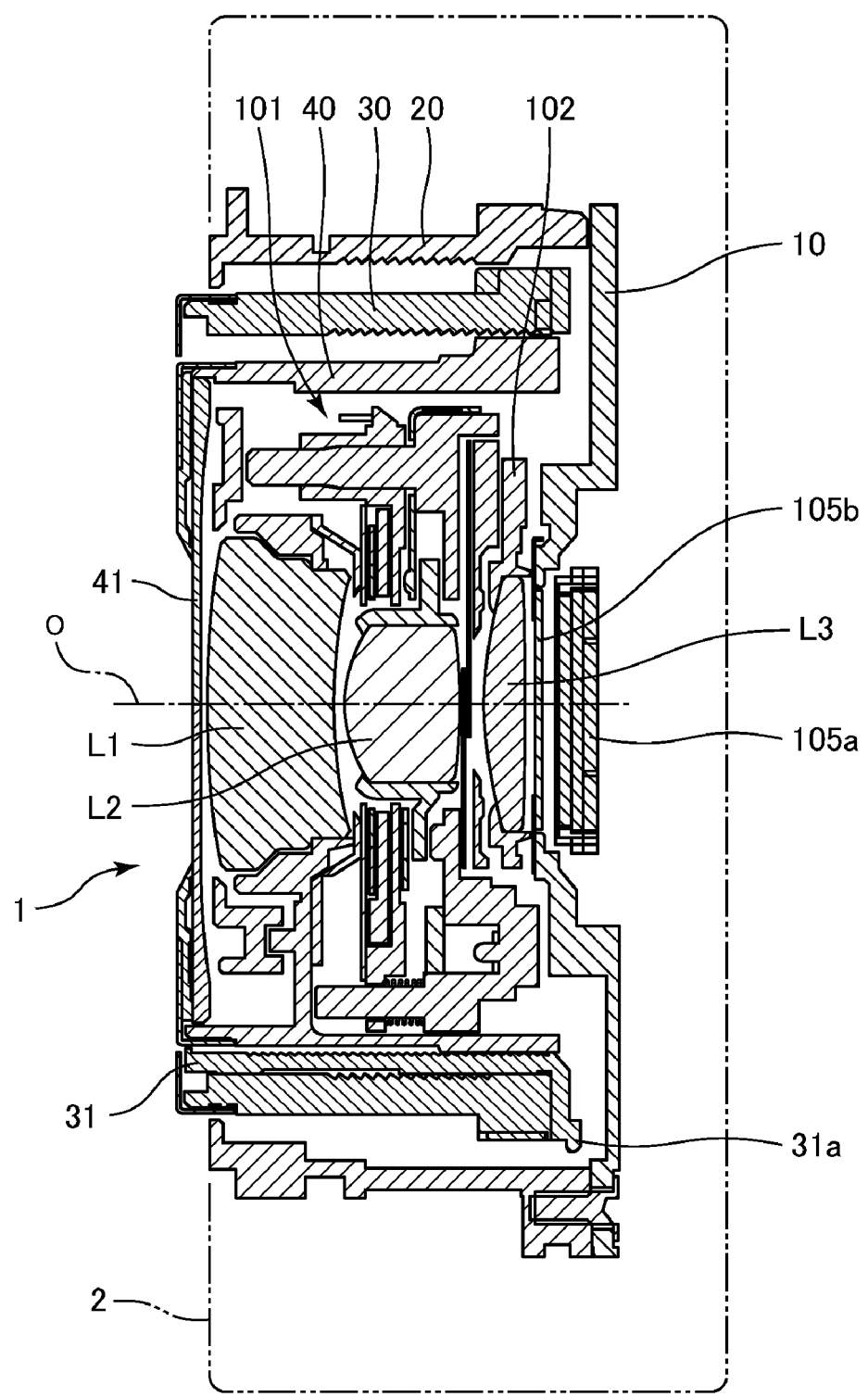
FIG. 2 is a sectional view showing the storage state of the imaging apparatus.

FIG. 2 is a sectional view showing the storage state of the imaging apparatus.

The imaging apparatus of the present embodiment includes a lens barrel 1 and a camera body 2.

The lens barrel 1 includes an imaging optical system having three lens groups: a first lens group L1, a second lens group L2, and a third lens group L3. Any of the first lens group L1, the second lens group L2, and the third lens group L3 may be configured with a single lens or a plurality of lenses.

Additionally, the lens barrel 1 is what is termed a "retractable lens barrel", and its state shifts between the image-taking state shown in FIG. 1 and the storage state shown in FIG. 2 in response to the power ON/OFF of the imaging apparatus. In the image-taking state, the cylinder length of the lens barrel 1 is relatively long. In the storage state, the cylinder length of the lens barrel 1 becomes shorter than that in the image-taking state to thereby be retracted inside the camera body 2.

The lens barrel 1 includes a stationary cylinder 20, a shifting cam cylinder 30, a linear regulation cylinder 31, and a first group cylinder 40.

The stationary cylinder 20, which is fixed to the image sensor base 10 that is fixed to the camera body 2, is a substantially cylindrical member that does not move during a zoom operation and focus operation. Spirally-shaped cam grooves (not shown) and linear guide grooves (not shown) formed parallel to the optical axis are provided at the inner circumference side of the stationary cylinder 20.

The shifting cam cylinder 30 is a substantially cylindrical member that is arranged at positions on the outer circumference side of the linear regulation cylinder 31 and the inner circumference side of the stationary cylinder 20. The shifting cam cylinder 30 has a plurality of cam grooves on the inner circumference side thereof, and has a cam follower portion and a gear portion on the outer circumference side thereof. The cam follower portion of the shifting cam cylinder 30 is cam-engaged with the cam grooves of the stationary cylinder 20. Also, the shifting cam cylinder 30 is provided so as to be rotatable around the optical axis with respect to the linear regulation cylinder 31 and integrally movable in the optical axis direction.

The linear regulation cylinder 31 is a substantially cylindrical member arranged on the inner circumference side of the stationary cylinder 20. The linear regulation cylinder 31, which has an outer circumferentially extending projection 31a, is regulated such that the movable direction is parallel to the optical axis due to the engagement of the projection 31a with the linear guide grooves of the stationary cylinder 20'. Also, the linear regulation cylinder 31 has a plurality of linear guide holes (not shown) formed to parallel to the optical axis.

The first group cylinder 40 is a member that is arranged on the inner circumference side of the linear regulation cylinder 31 and holds the first lens group L1. The first group cylinder 40 has an outer circumferentially extending cam follower portion (not shown). The cam follower portion of the first group cylinder 40 extends through the linear guide hole of the linear regulation cylinder 31 to cammingly engage with the cam grooves of the shifting cam cylinder 30. Hence, the first group cylinder 40 is regulated such that the movable direction is parallel to the optical axis. A barrier mechanism 41 is provided near the object-side distal end of the first group cylinder 40.

The second group unit 101 is a member that is arranged on the inner circumference side of the linear regulation cylinder 31 and holds the second lens group L2. The second group unit 101 has three outer circumferentially extending cam follower portions 101a (see FIG. 3) that are substantially evenly arranged in the peripheral direction about the optical axis O. The cam follower portion 101a of the second group unit 101 extends through the linear guide hole of the linear regulation cylinder 31 to cammingly engage with the cam grooves of the shifting cam cylinder 30. Hence, the second group unit 101 is regulated such that the movable direction is parallel to the optical axis.

A third group frame 102 is a member that holds the third lens group L3. In the imaging optical system of the present embodiment, the third lens group L3 functions as a focus lens group that moves in the optical axis direction during the focus operation. The third group frame 102 is provided such that it is guided by the AF guide shaft (not shown) fixed on an image sensor base 10 so as to be movable in a direction along the optical axis by a screw and a nut (not shown).

An image sensor 105a includes a CCD (Charge Coupled Device) image sensor or a CMOS (Complementary Metal-Oxide Semiconductor) image sensor. The image sensor 105a is fixed to the image sensor base 10 to convert an optical object image obtained by the lens barrel 1 into an electrical analog signal.

An optical component 105b such as color filter, low-pass filter, protective filter, or the like is provided on the object side of the image sensor 105a.

With the arrangement described above, the shifting cam cylinder 30 moves along the optical axis while being rotated in accordance with the cam grooves of the stationary cylinder 20, when the rotational driving force is transmitted from a zoom motor (not shown) to the shifting cam cylinder 30.

Also, the linear regulation cylinder 31 is guided by the linear guide grooves of the stationary cylinder 20, and moves along the optical axis together with the shifting cam cylinder 30 without rotation. Furthermore, the first group cylinder 40 and the second group unit 101 move along the optical axis without rotation in accordance with the cam grooves of the shifting cam cylinder 30 and with the guidance of the linear guide hole of the linear regulation cylinder 31.

Figure 3:
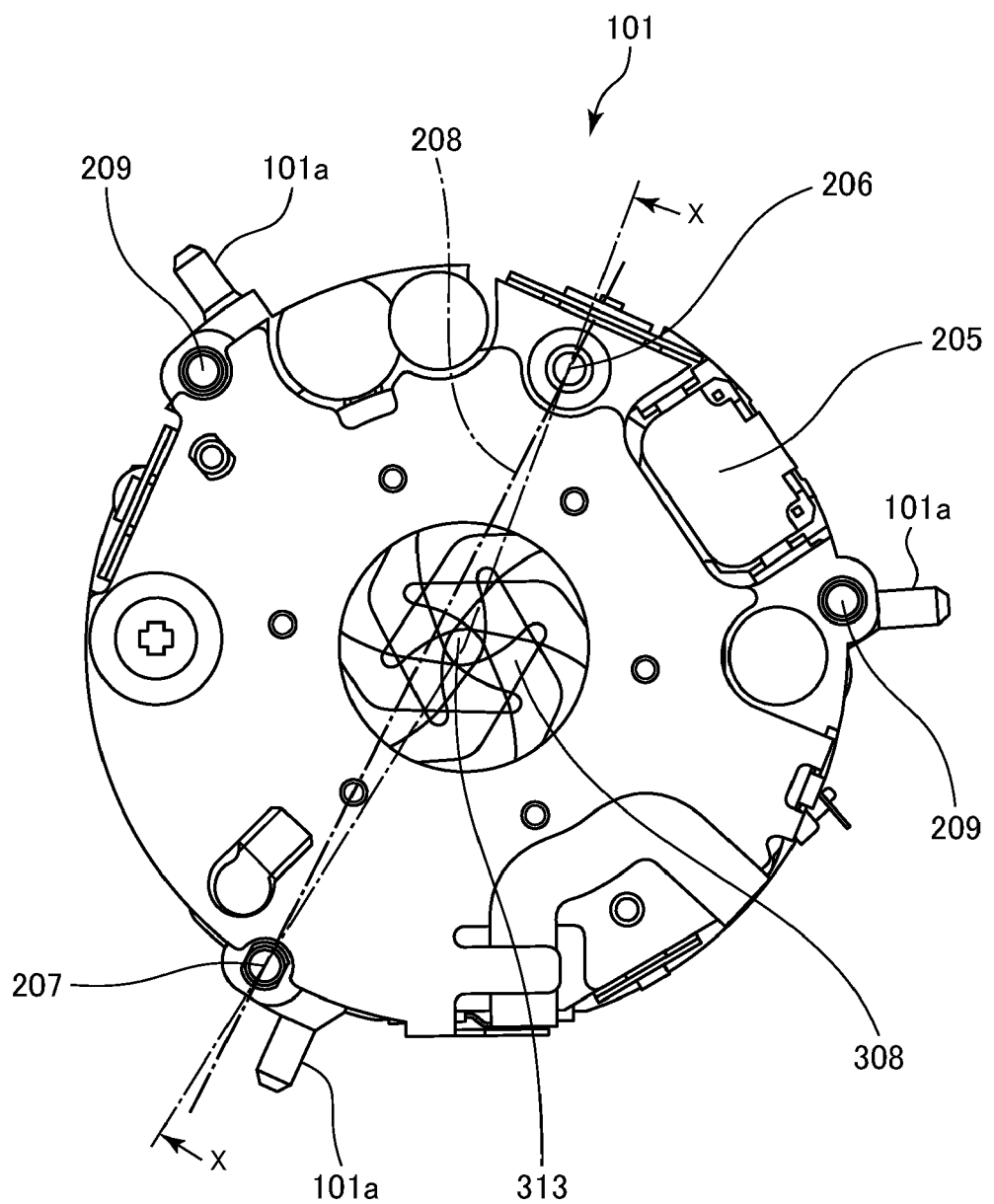
FIG. 3 shows a second group unit 101 in the image-taking state seen from the object side.

FIG. 3 shows the second group unit 101 in the image-taking state seen from the object side.

Figure 4:
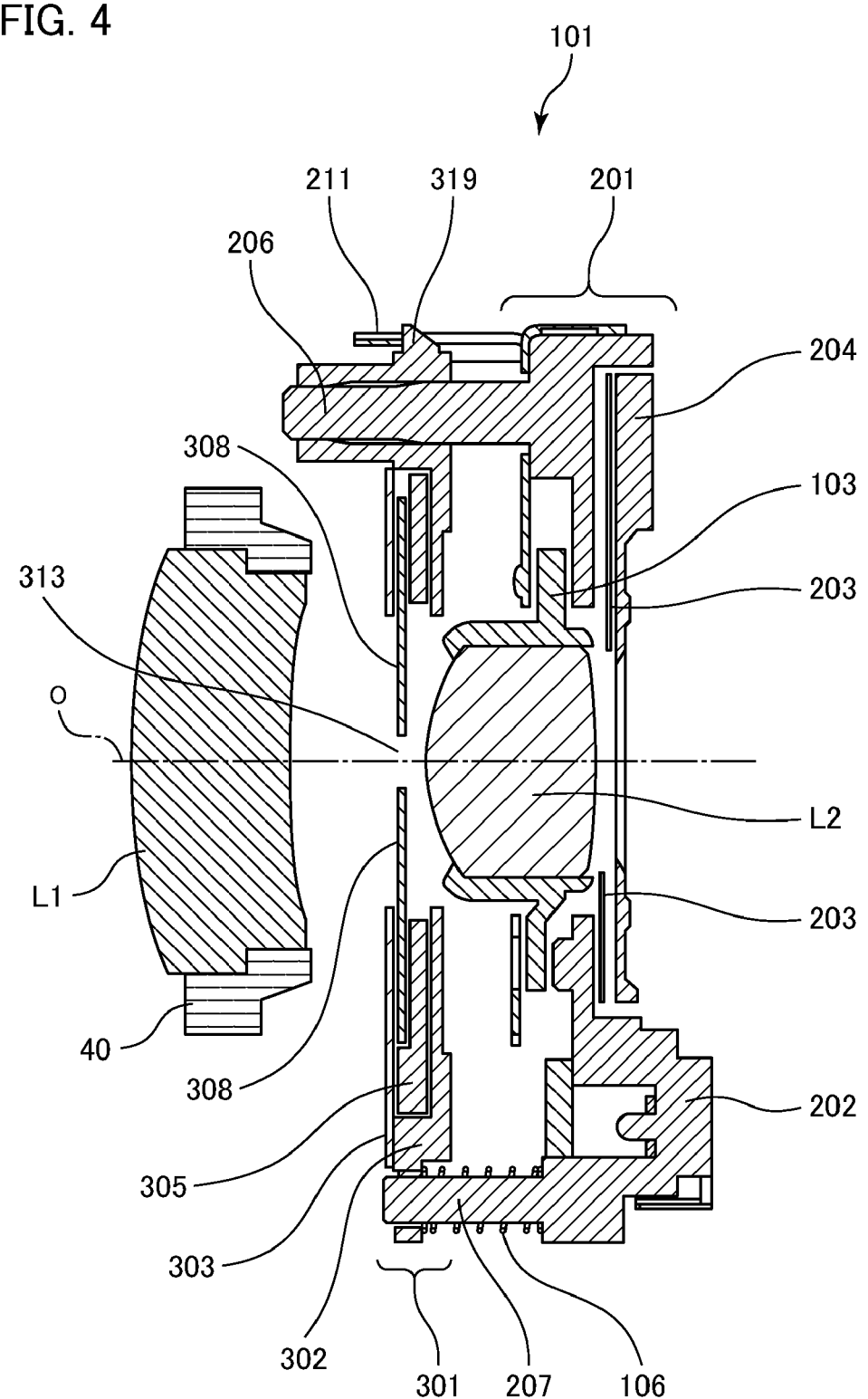
FIG. 4 is an enlarged sectional view of the second group unit 101 and the first lens group L1 in the image-taking state taken along the line X-X shown in FIG. 3.

FIG. 4 is an enlarged sectional view of the second group unit 101 and the first lens group L1 in the image-taking state taken along the line X-X shown in FIG. 3.

The second lens group L2 is fixed to a second group lens frame 103. The second group lens frame 103 is configured as a separate member from a shutter base 202, and is held in a state of being movable in a plane perpendicular to the optical axis O. The second group lens frame 103 is driven by an actuator (not shown) to perform an image shake correction operation. The second group lens frame 103 and the shutter base 202 may be configured with the same member.

The shutter unit 201 and the diaphragm unit 301 are formed separately and are arranged parallel to the optical axis O and by sandwiching the second lens group L2 therebetween. The shutter unit 201 is arranged by sandwiching the second lens group L2 at a position closer to the image sensor 105a than to the diaphragm unit 301. The shutter unit 201 includes the shutter base 202, a shutter blade 203, a shutter cover 204, and a shutter actuator 205.

The shutter blade 203 may be a single shutter blade or a multiple shutter blades depending on the space. The shutter blade 203 opens and closes by utilizing the power of the shutter actuator 205 and can be held in a completely opened state and completely closed state even if no current is flowing. In the image-taking state shown in FIGS. 3 and 4, the shutter blade 203 is in a completely opened state, and the electronic shutter of the image sensor 105a is employed without the operations of opening and closing the shutter blade 203 when a shooting is performed by pushing a release button (not shown).

The shutter blade 203 may function as what is termed a "mechanical shutter", which performs the operations of opening and closing the shutter blade 203 upon shooting, or may be in a form in which a mechanical shutter and an electronic shutter are used together.

Figure 5:
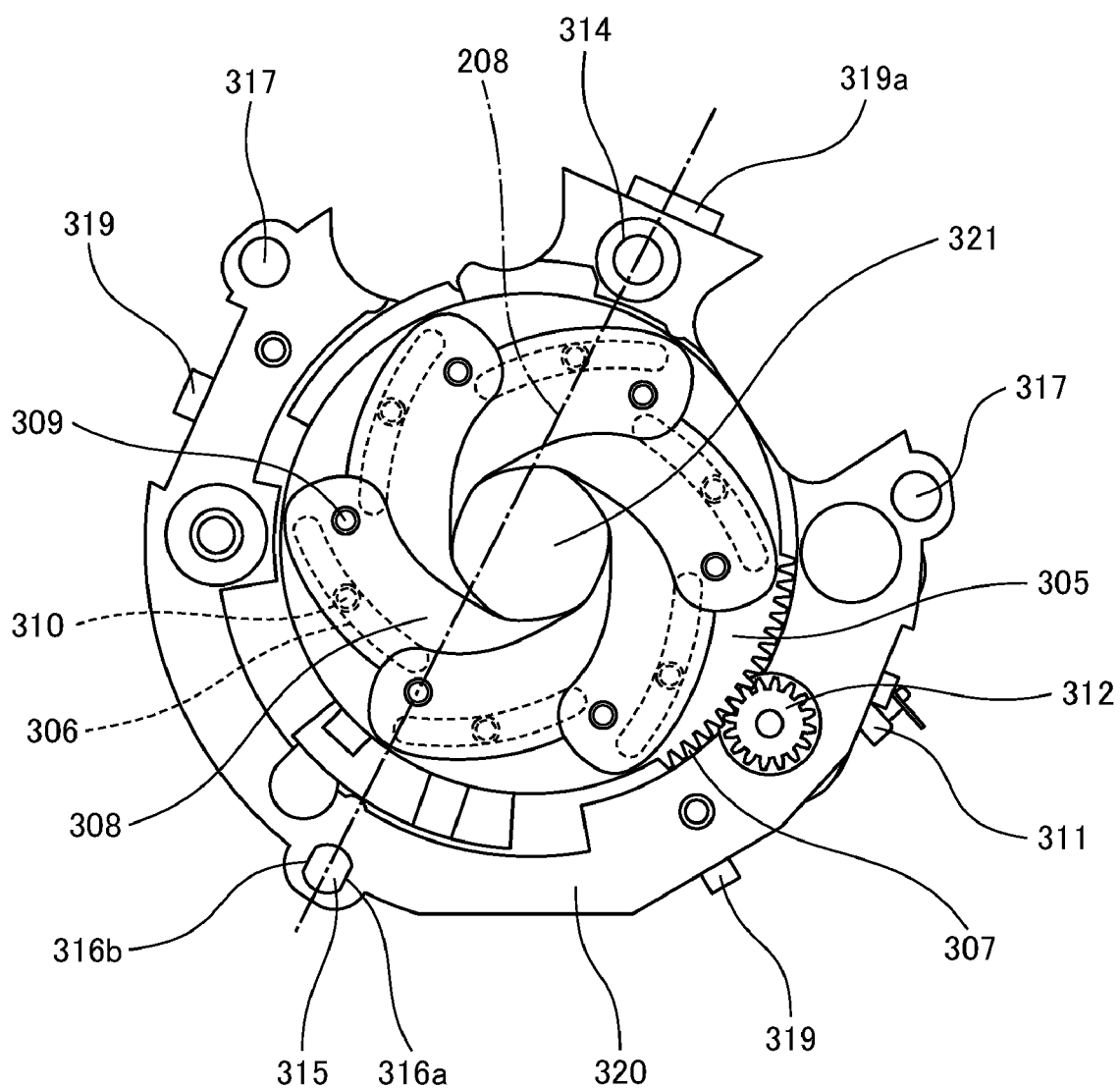
FIG. 5 shows the internal arrangement of a diaphragm unit 301 seen from the object side with a diaphragm cover 303 being removed.

FIG. 5 shows the internal arrangement of the diaphragm unit 301 seen from the object side with the diaphragm cover 303 being removed.

Figure 6:
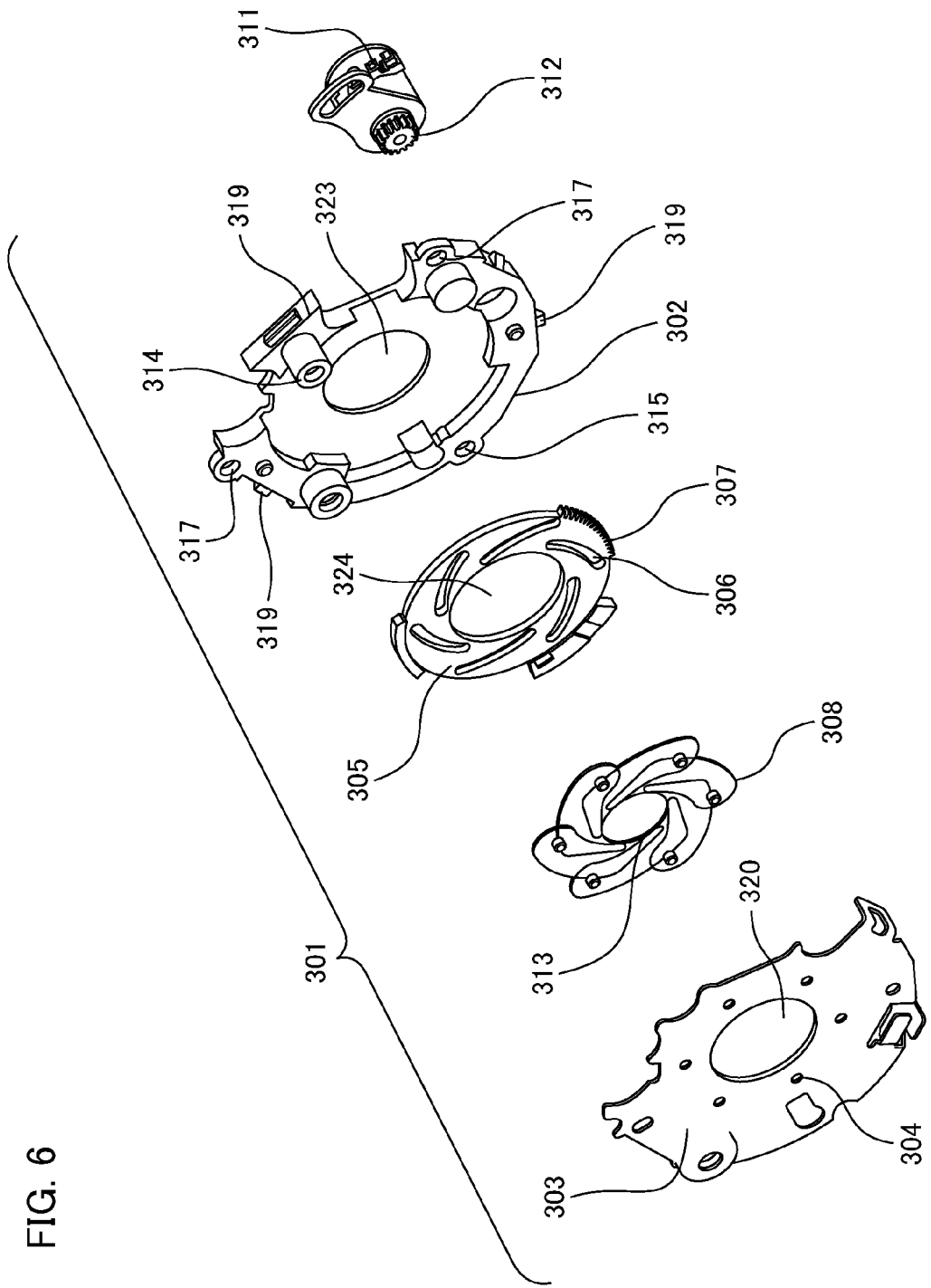
FIG. 6 is an exploded perspective view showing the diaphragm unit 301.

FIG. 6 is an exploded perspective view showing the diaphragm unit 301.

Figure 7:
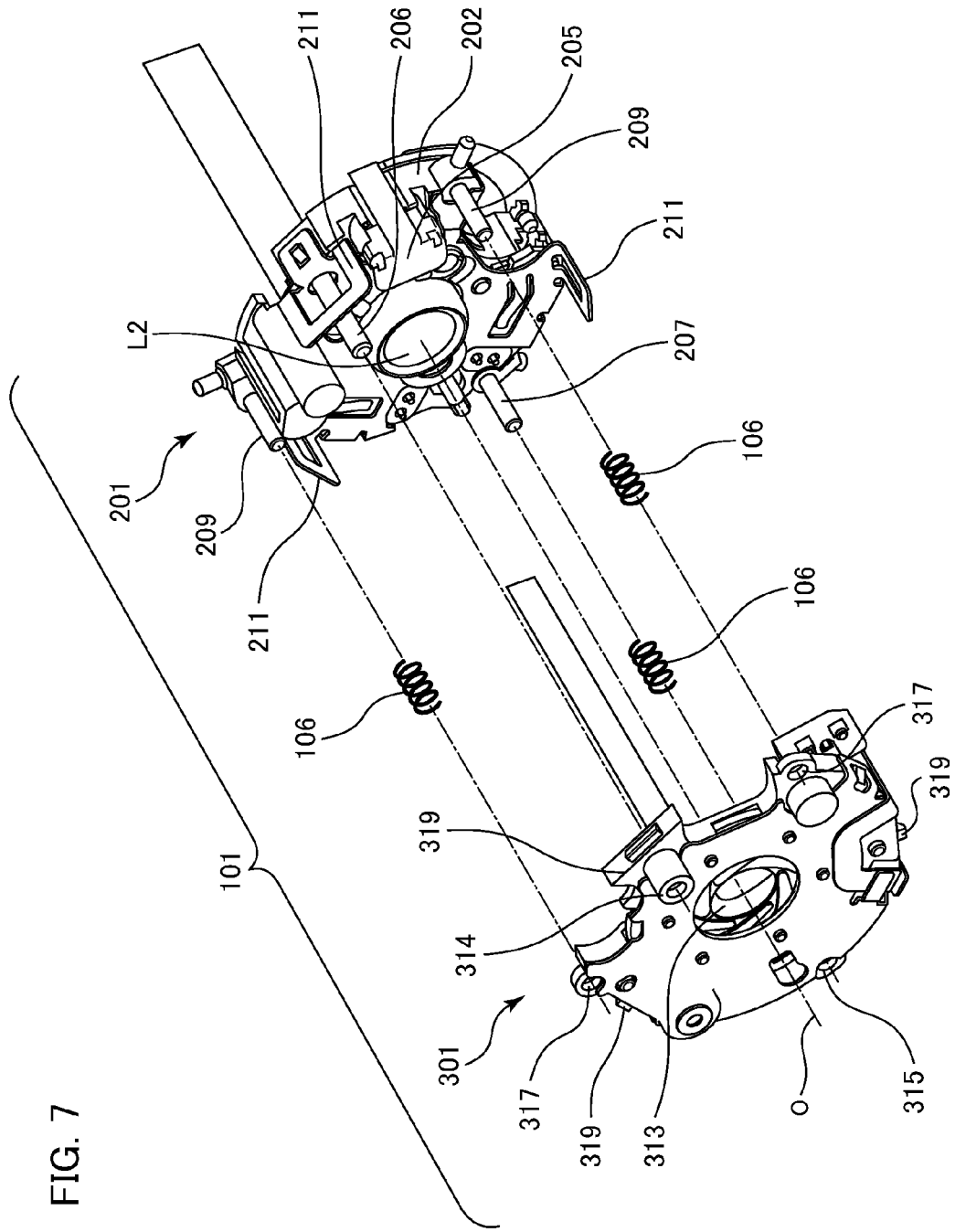
FIG. 7 is an exploded perspective view showing the second group unit 101.

FIG. 7 is an exploded perspective view showing the second group unit 101.

The diaphragm unit 301 includes a diaphragm base 302, the diaphragm cover 303, a diaphragm ring 305, diaphragm blades 308, a diaphragm actuator 311, and a gear 312, and restricts the opening diameter of the light path that passes through the lens barrel 1.

The gear 312 is attached to the driving shaft of the diaphragm actuator 311. Also, the diaphragm actuator 311 is fixed to the diaphragm base 302.

Rotational shafts 309 that engage with holes 304 provided in the diaphragm cover 303 are provided on the object side of the diaphragm blades 308. Pins 310 that engage with the cam grooves 306 provided in the diaphragm ring 305 are provided on the image sensor 105a side of the diaphragm blades 308. The plurality (six in the present embodiment) of the cam grooves 306 of the diaphragm ring 305 and the rotational shafts 309 of the diaphragm blades 308 are substantially evenly spaced and arranged about the optical axis O, respectively.

A gear portion 307 that meshes with the gear 312 fixed to the diaphragm actuator 311 is provided on the diaphragm ring 305. The power of the diaphragm actuator 311 is transmitted to the diaphragm ring 305 via the gear 312 and the gear portion 307 so as to rotationally drive the diaphragm blades 308 about the optical axis O.

The rotational shaft 309 in the diaphragm blades 308 is inserted into the hole 304 of the diaphragm cover 303. Also, the pin 310 of the diaphragm blades 308 is inserted into the cam groove 306 of the diaphragm ring 305.

The plurality of diaphragm blades 308 is evenly spaced about the optical axis O to form an aperture 313 in which the size of its opening diameter can be flexibly adjusted in this arrangement.

When the diaphragm ring 305 rotates about the optical axis O, the diaphragm blades 308 are rotationally translated along the cam groove 306 about the rotational shaft 309 so as to change the aperture 313 of the diaphragm unit 301 to an intended size.

In FIGS. 3 and 4, the diaphragm blades 308 are narrowed down to an opening diameter smaller than that in the diaphragm open state based on the assumption that a relatively bright object is photographed.

The shutter base 202 includes a main guide 206, an anti-vibration member 207, and a guide shaft 209 for the diaphragm unit 301.

The main guide 206 and the anti-vibration member 207 are respectively arranged substantially parallel to the optical axis O. They support the diaphragm unit 301 so as to be translatable in parallel to the optical axis direction and are arranged substantially symmetrically with respect to the optical axis O. The main guide 206 and the anti-vibration member 207 are inserted into a hole for the main guide 314 and a hole for the anti-vibration member 315 that are provided in the diaphragm base 302, respectively.

Also, the guide shaft 209 and the anti-vibration member 207 are arranged in the shutter base 202 so as to be substantially evenly spaced in the peripheral direction about the optical axis O. The guide shaft 209 is inserted into a hole for the guide shaft 317 that is provided in the diaphragm base 302.

Two parallel surfaces 316a and 316b, which are substantially parallel to a line 208 extending through the main guide 206 and the anti-vibration member 207 and are symmetrical, are formed on the hole for the anti-vibration member 315. The surfaces 316a and 316b restrict the diaphragm unit 301 from being rotated about the main guide 206 to guide linearly substantially parallel to the optical axis O.

The hole for the anti-vibration member 315 may have a U-shaped profile or the like in which a part of the surface has been deleted in dependence upon the configuration, as long as the surfaces 316a and 316b that are substantially parallel to the line 208 extending through the main guide 206 and the anti-vibration member 207 are formed.

While, in the present embodiment, the main guide 206 and the anti-vibration member 207 are provided in the shutter base 202, they may be provided in the diaphragm base 302 or another component in dependence upon the configuration.

The spring 106 is a compressed coil spring and is arranged between the diaphragm unit 301 and the shutter unit 201 substantially parallel to the optical axis O. Each of the guide shaft 209 and the anti-vibration member 207 that respectively guide the spring 106 is inserted into the inner diameter of the spring 106.

While, in the present embodiment, the anti-vibration member 207 of the diaphragm unit 301 is also used as the guide for the spring 106 as in the guide shaft 209, the anti-vibration member 207 may be independently arranged in dependence upon the configuration of the diaphragm unit 301 and the shutter unit 201.

The hole for the guide shaft 317 and the hole for the anti-vibration member 315 into which the guide shaft 209 and the anti-vibration member 207 are respectively inserted and the hole for the main guide 314 into which the main guide 206 is inserted are provided in the diaphragm base 302.

While, in the present embodiment, the hole for the guide shaft 317 and the hole for the anti-vibration member 315 are provided in the diaphragm base 302, these shapes need not be a slot-like shape in dependence upon the space or configuration.

In addition, while the guide shaft 209 and the anti-vibration member 207 are provide in the shutter base 202 and the hole for the guide shaft 317 and the hole for the anti-vibration member 315 are provided in the diaphragm base 302, they may be provided in another component if the arrangement presents any difficulties.

A spring 106 abuts a part of the component of the diaphragm unit 301 in the object side, and abuts a part of the component of the shutter unit 201 in the image sensor 105a side. Hence, the spring 106 urges the diaphragm unit 301 and the shutter unit 201 away from each other.

A stopper 211 for restricting the optical axial position of the diaphragm unit 301 is provided on the shutter unit 201. A hook 319 that abuts the stopper 211 is provided on the diaphragm unit 301. The diaphragm unit 301 is urged by the spring 106 in a direction away from the shutter unit 201. In the image-taking state, the diaphragm unit 301 is held in a predetermined position in the optical axis direction by the stopper 211 of the shutter unit 201.

Figure 8:
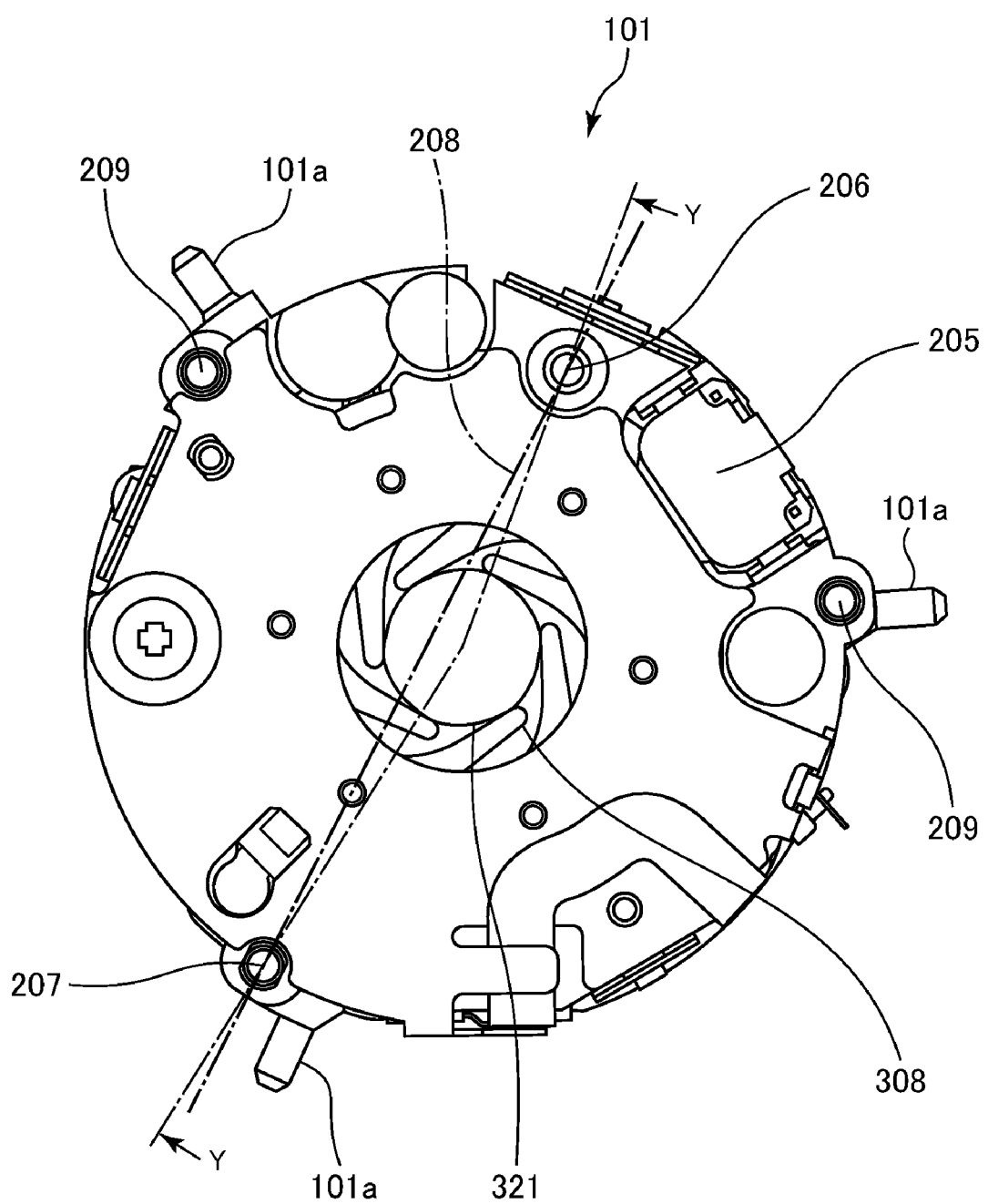
FIG. 8 shows the second group unit 101 in the diaphragm open state in the image-taking state seen from the object side.

FIG. 8 shows the second group unit 101 in the diaphragm open state in the image-taking state seen from the object side.

Figure 9:
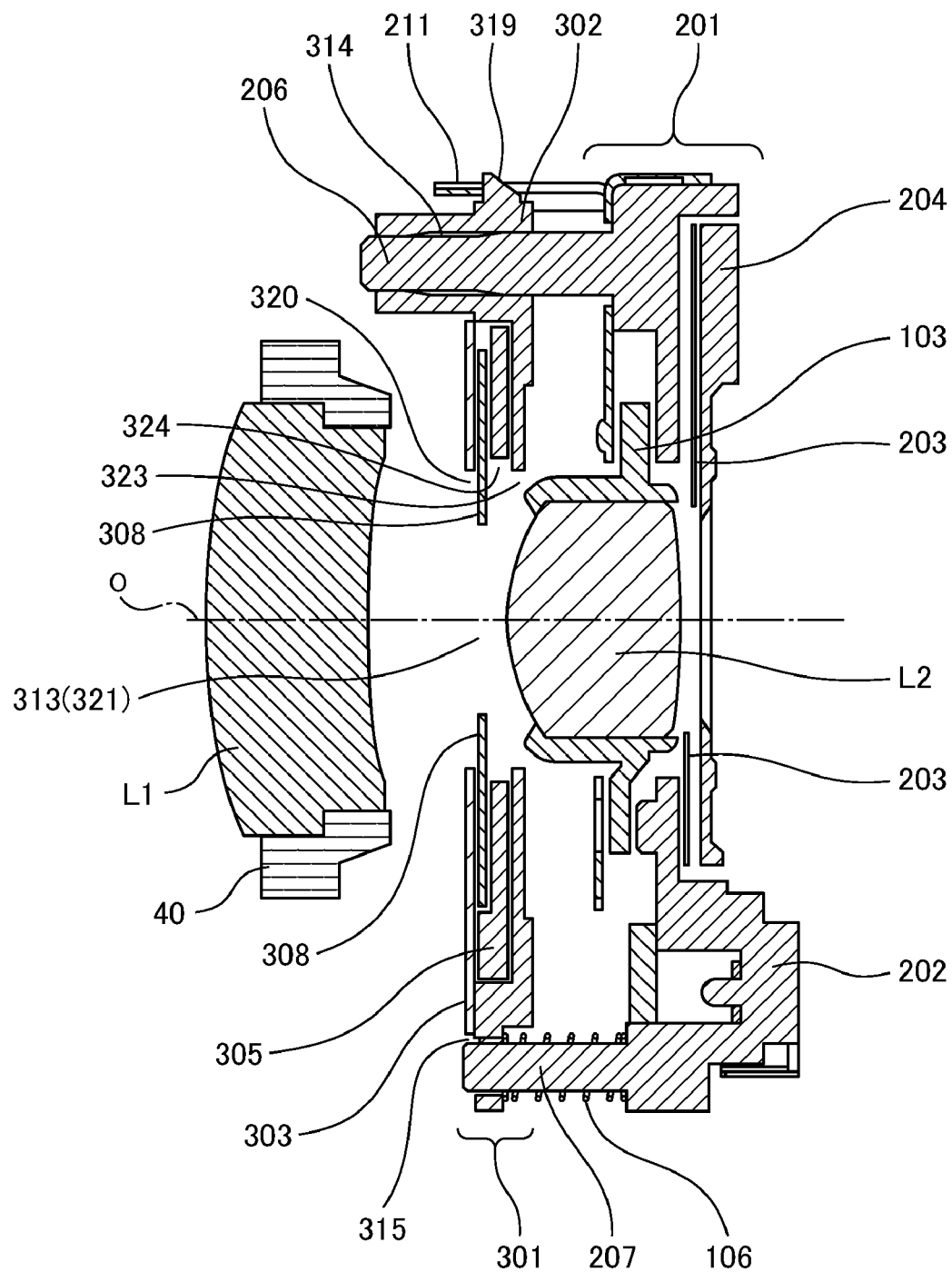
FIG. 9 is an enlarged sectional view of the second group unit 101 and the first lens group L1 in the diaphragm open state in the image-taking state taken along the line Y-Y shown in FIG. 8.

FIG. 9 is an enlarged sectional view of the second group unit 101 and the first lens group L1 in the diaphragm open state in the image-taking state taken along the line Y-Y shown in FIG. 8.

The above FIGS. 3 and 4 show the state in which the diaphragm blades 308 are narrowed down to an opening diameter smaller than that in the diaphragm open state. However, since the diaphragm blades 308 are in the diaphragm open state in FIGS. 8 and 9, the opening diameter formed by the diaphragm blades 308 is larger than that shown in FIGS. 3 and 4.

As used herein, the term "diaphragm open state" refers to the state in which the diaphragm blades 308 are opened such that an effective opening diameter becomes an aperture value that is set as a maximum diameter in the image-taking state for an imaging optical system including the first lens group L1, the second lens group L2, and the third lens group L3. In the conventional photographic device, the diameter in the diaphragm open state in the image-taking state is the maximum diameter to which the diaphragm blades can be opened. On the other hand, the diaphragm unit 301 of the present embodiment is, in the storage state, in a state in which an opening diameter is larger than that in the diaphragm open state. The storage state will be described hereinbelow.

Figure 10:
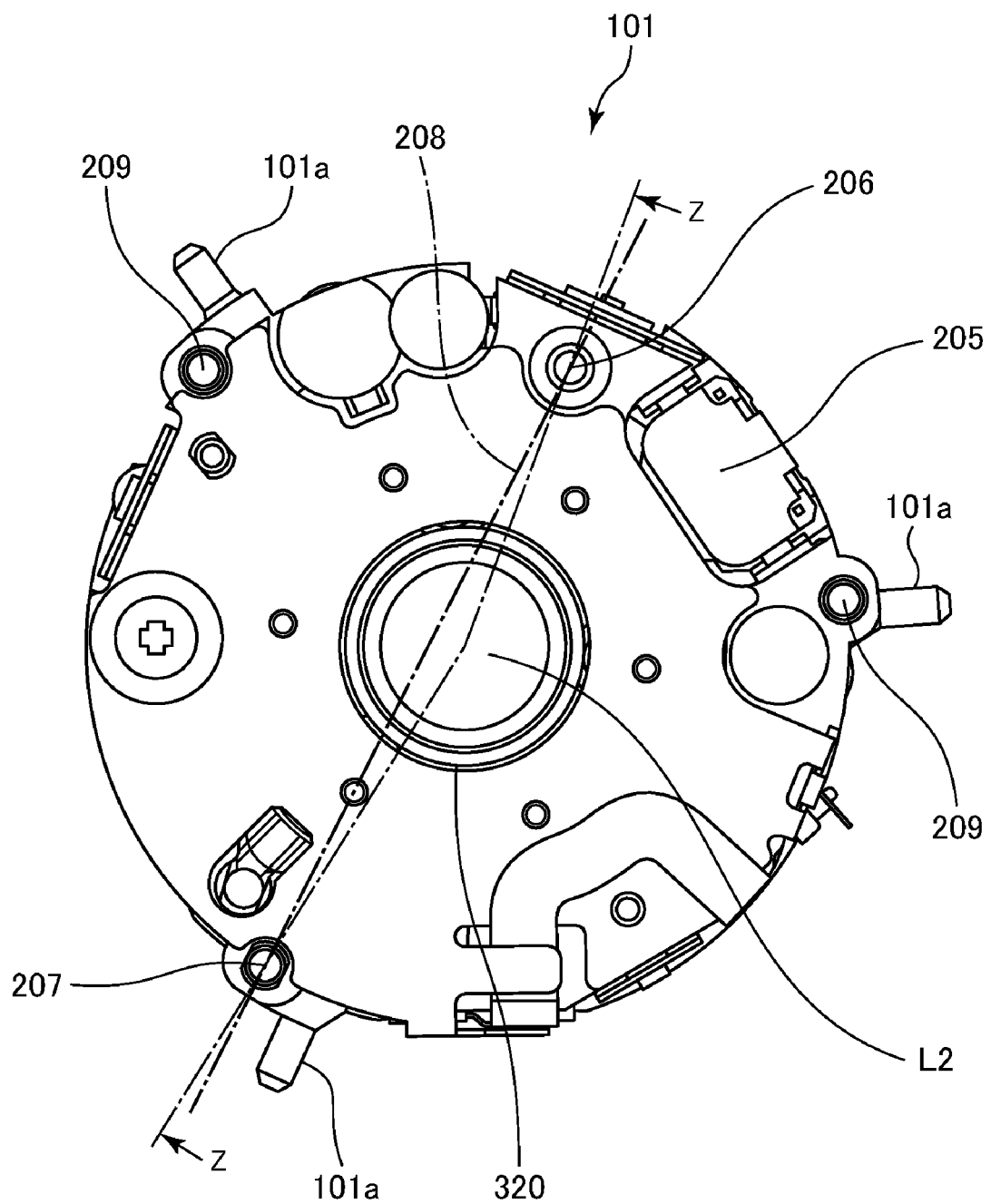
FIG. 10 shows the second group unit 101 in the storage state seen from the object side.

FIG. 10 shows the second group unit 101 in the storage state seen from the object side.

Figure 11:
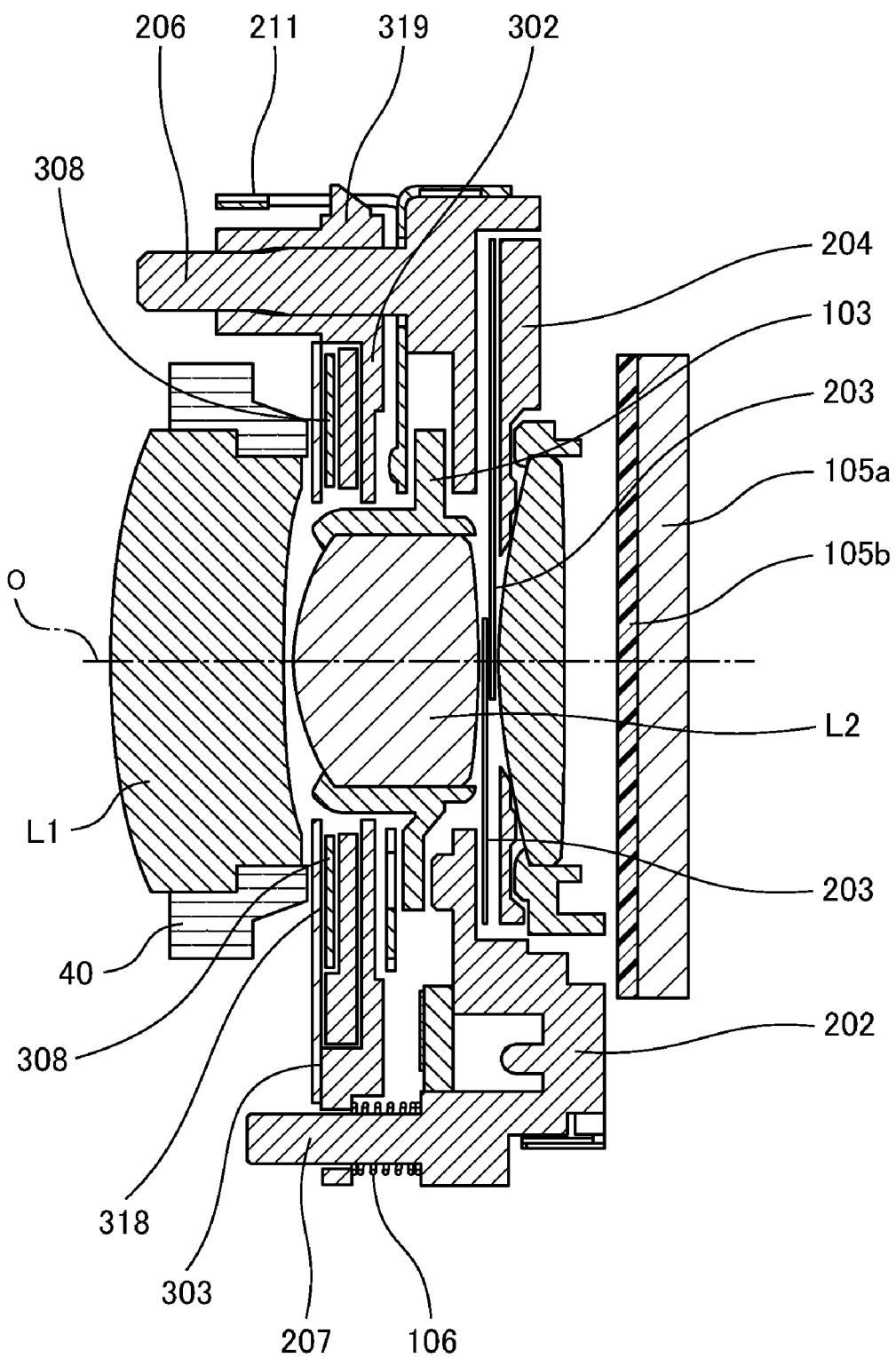
FIG. 11 is an enlarged sectional view of the second group unit 101 and the first lens group L1 in the storage state taken along the line Z-Z shown in FIG. 10.

FIG. 11 is an enlarged sectional view of the second group unit 101 and the first lens group L1 in the storage state taken along the line Z-Z shown in FIG. 10.

When the lens barrel 1 transitions from the image-taking state to the storage state, the diaphragm blades 308 are retracted closer to the outer periphery side than the aperture 320 provided in the diaphragm cover 303 in order to prevent interference between the second lens group L2 and the second group lens frame 103. At this time, the diaphragm blades 308 transfer to a state (hereinafter referred to as "super-open state") in which they are opened wider than the opening diameter 321 in the diaphragm open state during the image-taking state and are held in that state. The aperture 320 and apertures 232 and 324 to be described below are shown in FIG. 9.

In addition, any opening diameter of the aperture 320 provided in the diaphragm cover 303 and the aperture 323 provided in the diaphragm base 302 is larger than the outer diameter of the object side portion of the second lens group L2 and the second group lens frame 103. Furthermore, the opening diameter of the aperture 324 provided in the diaphragm ring 305 is larger than the opening diameter of the aperture 320 provided in the diaphragm cover 303 and the aperture 323 provided in the diaphragm base 302.

Hence, the object side portion of the second lens group L2 and the second group lens frame 103 can be inserted into the aperture of the diaphragm unit 301 without interfering with other members.

When the transition continues from the image-taking state to the storage state, the first lens group L1, which is arranged closer to the object side than the diaphragm unit 301, moves in a direction toward the image sensor 105a so as to come closer to the diaphragm cover 303. Consequently, the first group cylinder 40 for holding the first lens group L1 abuts the diaphragm cover 303 to thereby press the diaphragm unit 301 to the image sensor 105a.

This pressing causes the spring 106 to be compressed via the diaphragm unit 301. Then, the diaphragm unit 301 moves to the image sensor 105a side substantially parallel to the optical axis O along the main guide 206 and the anti-vibration member 207 that are supported by the shutter unit 201.

In the present embodiment, the diaphragm unit 301 is pressed by the first group cylinder 40 for holding the first lens group L1. However, the diaphragm unit 301 may be pressed by other components depending on the lens configuration and other mechanisms.

With the movement of the diaphragm unit 301 to the image sensor 105a side, at least a part (protruded portion on the object side in the present embodiment) of the second lens group L2 and the first group cylinder 40 enters in the apertures (313, 320, 323, 324) of the diaphragm unit 301. With this arrangement, the cylinder length of the lens barrel 1 can be shortened in the storage state.

In addition, the shutter blade 203 can be opened and closed regardless of the state of the lens barrel. Therefore, the performance degradation of the optical component 105b such as a color filter, a low-pass filter, a protective filter, and the like, which are provided in the image sensor 105a and on the object side of the image sensor 105a, can be prevented by closing the shutter blade 203 in the storage state.

As described above, according to the present embodiment, a part of the second lens group L2 and the first group cylinder 40 is inserted into the apertures (313, 320, 323, 324) of the diaphragm unit 301 and the shutter blade 203 of the shutter unit 201 is closed to ensure light shielding. Therefore, the cylinder length in the storage state is shortened, and the performance degradation of the image sensor 105a and the optical component 105b provided on the front side of the image sensor can be prevented as well.

In the present embodiment, a description has been given taking an example in which the diaphragm blades 308 are in the super-open state and the shutter blade 203 is in the completely closed state. The present invention is not limited thereto and applies to a configuration in which one is relatively moveable with respect to a lens and is opened in the storage state so as to insert at least a part of the lens while the other is closed. For example, the shutter blade may be fully opened and the diaphragm blades 308 may be fully closed.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not restricted to the disclosed exemplary embodiments. The scope of the following claims is to be accorded the broadest interpretation so as to encompass all such modifications and equivalent structures and functions.

This application claims the benefit of Japanese Patent Application No. 2008-335558 filed Dec. 27, 2008 which are hereby incorporated by reference herein in their entirety.

What is claimed is:

1. A lens barrel comprising:
a lens that moves in a direction along its optical axis between an image-taking state and a storage state;
a diaphragm unit configured to restrict the amount of light passing through the lens in the image-taking state;
a shutter unit configured to open so as to permit the light to pass through the lens in the image-taking state; and
an image sensor configured to convert an optical signal passed through the lens into an electrical signal,
wherein one of the diaphragm unit and the shutter unit moves in a direction along the optical axis of the lens and opens in the storage state so as to arrange at least a part of the lens within a first aperture created by the opening, and the other one of the diaphragm unit and the shutter unit closes a second aperture so as to prevent the light from passing through the lens in the storage state, and
wherein one of the diaphragm unit and the shutter unit, which opens in the storage state so as to arrange at least a part of the lens within the first aperture, opens in the storage state to an opening diameter larger than a maximum opening diameter in the image-taking state.

2. The lens barrel according to claim 1, wherein the diaphragm unit and the shutter unit open and close independently regardless of a state of the lens barrel.

3. The lens barrel according to claim 1, wherein the one of the diaphragm unit and the shutter unit closes the second aperture so as to prevent the light from passing through the lens in the storage state and moves integrally with movement of the lens in the direction along the optical axis.

4. An imaging apparatus comprising:
a lens barrel comprising:
a lens that moves in a direction along its optical axis between an image-taking state and a storage state;

a diaphragm unit configured to restrict the amount of light passing through the lens in the image-taking state;
a shutter unit configured to open so as to permit light to pass through the lens in the image-taking state; and
an image sensor configured to convert an optical signal passed through the lens into an electrical signal,
wherein one of the diaphragm unit and the shutter unit moves in a direction along the optical axis of the lens and opens in the storage state so as to arrange at least a part of the lens within a first aperture created by the opening, and the other one of the diaphragm unit and the shutter unit closes a second aperture so as to prevent the light from passing through the lens in the storage state, and
wherein the one of the diaphragm unit and the shutter unit, which opens in the storage state so as to arrange at least a part of the lens within the first aperture, opens in the storage state to an opening diameter larger than a maximum opening diameter in the image-taking state; and
an imaging unit configured to image an object image obtained by the lens barrel.

5. A method for controlling a lens barrel that includes an image sensor configured to convert an optical signal passed through the lens into an electrical signal, the method comprising:
moving a lens in a direction along its optical axis between an image-taking state and a storage state;
restricting an opening diameter of a diaphragm unit to restrict the amount of light passing through the lens in the image-taking state; and
opening a shutter unit so as to permit the light to pass through the lens in the image-taking state,
wherein one of the diaphragm unit and the shutter unit moves in a direction along the optical axis with respect to the lens and opens in the storage state so as to arrange at least a part of the lens within a first aperture created by the opening, and the other one of the diaphragm unit and the shutter unit closes a second aperture so as to prevent the light from passing through the lens in the storage state, and
wherein the one of the diaphragm unit and the shutter unit, which opens in the storage state so as to arrange at least a part of the lens within the first aperture, opens in the storage state to an opening diameter larger than a maximum opening diameter in the image-taking state.

6. The method according to claim 5, wherein the diaphragm unit and the shutter unit open and close independently regardless of a state of the lens.

7. The method according to claim 5, wherein the one of the diaphragm unit and the shutter unit closes the second aperture so as to prevent the light from passing through the lens in the storage state and moves integrally with movement of the lens in the direction along the optical axis.

8. The method according to claim 5, further comprising:
imaging an object image obtained by the lens barrel by an imaging unit.

9. A lens barrel comprising:
a lens that moves in a direction along its optical axis between an image-taking state and a storage state;
a diaphragm unit configured to restrict the amount of light passing through the lens in the image-taking state;
a shutter unit configured to open so as to permit the light to pass through the lens in the image-taking state; and
an image sensor configured to convert an optical signal passed through the lens into an electrical signal,
wherein the diaphragm unit moves in a direction along the optical axis of the lens and opens in the storage state so as to arrange at least a part of the lens within a first aperture created by the opening, and the shutter unit closes a second aperture so as to prevent the light from passing through the lens in the storage state, and
wherein the diaphragm unit opens in the storage state to an opening diameter larger than a maximum opening diameter in the image-taking state.

10. An imaging apparatus comprising:
a lens barrel comprising:
a lens that moves in a direction along its optical axis between an image-taking state and a storage state;
a diaphragm unit configured to restrict the amount of light passing through the lens in the image-taking state;
a shutter unit configured to open so as to permit the light to pass through the lens in the image-taking state; and
an image sensor configured to convert an optical signal passed through the lens into an electrical signal,
wherein the diaphragm unit moves in a direction along the optical axis of the lens and opens so as to arrange at least a part of the lens within a first aperture created by the opening, and the shutter unit closes a second aperture so as to prevent the light from passing through the lens in the storage state, and
wherein the diaphragm unit opens in the storage state to an opening diameter larger than a maximum opening diameter in the image-taking state; and
an imaging unit configured to image an object image obtained through the lens barrel.

* * * * *